United States Patent [19]

Premkumar et al.

[11] Patent Number: 5,286,577
[45] Date of Patent: Feb. 15, 1994

[54] DRAWN CONDUCTORS FOR CRYOGENIC APPLICATIONS

[75] Inventors: M. K. Premkumar, Monroeville, Pa.; Gary W. Malette, Massena, N.Y.

[73] Assignee: Aluminum Company of America, Pittsburgh, Pa.

[21] Appl. No.: 557,218

[22] Filed: Jul. 23, 1990

[51] Int. Cl.$^5$ .............................. B32B 15/20
[52] U.S. Cl. .................. 428/558; 428/654; 428/614; 174/126.2
[58] Field of Search .................. 428/558, 654

[56] References Cited

U.S. PATENT DOCUMENTS

| | | | |
|---|---|---|---|
| 3,502,789 | 3/1970 | Barber et al. | 174/128 |
| 3,710,000 | 1/1973 | Shattes et al. | 174/15 C |
| 3,730,967 | 5/1973 | Nicol | 174/15 C |
| 3,767,842 | 10/1973 | Bronca et al. | 174/128 |
| 3,800,061 | 3/1974 | Larson et al. | 174/15 C |
| 3,836,404 | 9/1974 | Straus | 148/11.5 R |
| 4,148,129 | 4/1979 | Young | 29/599 |
| 4,200,767 | 4/1980 | Nomura et al. | 174/125.1 |
| 4,242,536 | 12/1980 | Young | 174/128 S |
| 4,711,825 | 12/1987 | Oberly et al. | 428/654 X |
| 4,743,713 | 5/1988 | Scanlan | 174/125.1 |

*Primary Examiner*—Donald P. Walsh
*Assistant Examiner*—Ngoclan T. Mai
*Attorney, Agent, or Firm*—Daniel A. Sullivan, Jr.; Carl R. Lippert

[57] ABSTRACT

Wire of co-drawn composite of conductor core and matrix is provided, for instance in the form of high purity aluminum conductor and Al-Fe-Ce alloy matrix, suitable for use for electrical conduction at cryogenic temperatures. Included are extrusion and drawing processes enabling successful production.

11 Claims, 9 Drawing Sheets

DRAWN CONDUCTORS FOR CRYOGENIC APPLICATIONS

CONTRACT REFERENCE

This invention was made with Government support under Contract No. F33615-86-C-2682 awarded by the United States Air Force. The Government has certain rights in this invention.

TECHNICAL FIELD

This invention relates to drawn composites and more particularly to wire for the conduction of electrical current at cryogenic temperatures and processes for manufacturing such wire. Improvements in extrusion practice and alloy composition contribute to these goals.

BACKGROUND OF INVENTION

Electrical resistance of pure metals at cryogenic temperatures is extremely low. This makes pure metals attractive as cryogenic conductors. Of all the pure metals, aluminum is particularly promising for a number of reasons. Primary among these reasons is the low density of aluminum which makes it an optimum choice for weight critical applications such as space based systems. Secondly, aluminum has very high electrical and thermal conductivity at cryogenic temperatures. Aluminum also can be more economically produced in a high purity form than the other conductor material most commonly used, copper. The third most important advantage aluminum possesses over copper is its behavior in a strong magnetic field ($>2$ Tesla). In the presence of a strong magnetic field, the electrical resistance of most pure metals increases. However, in the case of aluminum, the resistance approaches a saturation value at high magnetic fields or in essence has a very small linear increase with field. See H. Nomura, M. Obata and S. Shimanoto, *Cryogenics*, Vol. II, No. 5, p. 396, 1971. In comparison, copper shows a strong increase in resistance with field.

High purity aluminum conductors have very favorable electrical properties at the boiling point of hydrogen, 20K, and hence they are excellent candidate materials for use at this temperature. The resistance of high purity aluminum at this temperature is 1/500th its resistance at room temperature. In addition, it has been shown that the advantage of reducing resistivity of a cooled high purity aluminum conductor exceeds the energy spent to obtain the low temperatures. See V. I. Gostishehev, "Cryogenic Conductor Made of High Purity Aluminum", *Fiz. Met. Metalloved*, Vol. 62, No. 2, p. 303, 1986. An important advantage of 99.999 percent pure aluminum occurs at 20K, where such conductors are ideally suited for space based applications on the basis of liquid $H_2$ being used as a fuel source and being available for use as a cryogen. Additionally, aluminum conductors are preferred over conventional superconductors in certain applications. Conventional superconductors require liquid He (4.2K) for their operation and the equipment for liquefaction and handling of liquid He adds complication and weight to the overall system. The advantage of aluminum is particularly true for fast pulsed power devices where superconductors are inherently unstable.

Due to its low mechanical strength, high purity aluminum needs to be structurally supported to withstand the large electromagnetic forces generated in high current density devices. As indicated in the article of Gostishehev, in windings made of cryogenic conductors, mechanical stresses come from two sources: the interaction of the magnetic field with the flowing currents and residual stresses during cooling. The stresses due to magnetic forces can be very significant and the high plasticity of aluminum can result in severe permanent deformation. Besides causing physical damage to the windings, the plastic strain also increases the resistance of the conductor significantly. Hence, in order to overcome the negative effects of low strength, pure aluminum conductors have to be structurally reinforced by some means.

High purity Al conductor may be braided with a high strength material to provide mechanical support. A preferred approach with economic and technical benefits is to embed the Al in a high strength matrix and co-fabricate them. The matrix material supporting the conductor in the composite assembly must have high strength, good thermal conductivity to remove heat generated in the conductor due to passage of current, reasonably high electrical resistivity to minimize eddy current losses in the matrix and workability compatible with high purity aluminum. In the absence of a barrier, probably the most important requirement is that the alloying elements of the matrix must have very low diffusion rates in aluminum to prevent contamination of the high purity Al conductor during processing. This precludes the use of most commercial aluminum alloys.

Powder metallurgy (P/M) processed Al-Fe-Ce alloys provide a good combination of properties toward satisfying the above requirements for a matrix material. These alloys were actually designed for elevated temperature applications and utilize thermodynamically stable aluminides for dispersion strengthening. The alloying elements Fe and Ce are two of the slowest diffusing species in aluminum. Research efforts at the Aero Propulsion Laboratories, Wright Patterson Air Force Base, Dayton, Ohio have demonstrated the feasibility of co-extruding a multifilament composite conductor, consisting of Al filaments in an Al-Fe-Ce matrix. See C. E. Oberly et al., U.S. Pat. No. 4,711,825, 1985 December 08, and J. C. Ho, C. E. Oberly, H. L. Gegel, W. T. O,Hara, Y. U. R. K. Prasad and W. M. Griffith, "Composite Aluminum Conductors for Pulsed Power Applications at Liquid Hydrogen Temperatures," *Fifth IEEE Pulsed Power Conference*. Arlington, Va., 1985 June 11. While 4,711,825 mentions the concept of using wire drawing for manufacturing its composite conductors, we do not believe such to have been accomplished, at least not in a practical sense, prior to the present invention. Thus, there can be varying degrees of success in the drawing of wire. For instance, it is one thing to pull a material straight on a draw bench, and quite another accomplishment to be able to pull material essentially continuously using a draw block to accomodate the drawn material as it collects.

DISCLOSURE OF INVENTION

It is an object of this invention to provide technology for the drawing of a composite product comprising electrical conductor and matrix material.

A further object is the provision of such technology enabling production of long, commercial quantities of composite wire.

Another object of the invention is to provide technology which enables the drawing of composite wire of electrical conductor and matrix material using a draw block.

An additional object is the provision of composite aluminum conductor usable as cryoconductor for newly emerging transportation technology such as trains utilizing magnetic levitation.

These as well as other objects which will become apparent from the disclosure which follows are accomplished according to the invention by the provision of commercially viable fabrication processing to produce such conductor by wire drawing technology.

A composite product of the invention comprises co-drawn (i.e. both drawn together, as one unit, in a wire drawing process) conductor and matrix. This is unlike the situation in, for example, 4,743,713 and 4,917,965 where the conductor material does not exist during drawing, but is subsequently created by reaction.

Four digit aluminum alloy designations as used herein are those of the Aluminum Association, Washington, D.C.; for further detail, see, for instance, the book ALUMINUM: PROPERTIES AND PHYSICAL METALLURGY, American Society for Metals, Metals Park, Ohio (1984), or the publications of the Aluminum Association.

Residual Resistivity Ratio (RRR) is defined as the ratio of resistivity at room temperature ($p300$ k) to resistivity at the temperature of liquid helium at atmospheric pressure ($p4.2$ k).

Percentages given herein are on a weight basis unless indicated otherwise.

The invention includes the following considerations:

Material

In general, composites of the present invention have the higher strength material on the outside and the lower strength material on the inside. In the case of aluminum, highest purity means highest conductivity, but, lacking alloying elements, the high purity material is of lower strength than aluminum alloys. Placement of the higher strength material on the outside is advantageous, both from the point of view of protecting the internal, softer material from accidental scarring and other damage and from the point of view of having the stronger material removed from the neutral axis, in the sense that a pipe is stronger than a rod of the same cross sectional area.

The composite constituent materials used in U.S. Pat. No. 4,711,825, i.e. high-purity aluminum filaments in an Al-8.4% Fe-3.6% Ce alloy matrix, form one example of the invention. As pointed out in U.S. Pat. No. 4,711,825, apart from good mechanical and electrical properties, this lightweight matrix material is preferred from other considerations also. For instance, being metallic, it has reasonably good thermal conductivity required for fast thermal response. Also, its compatible workability with high-purity aluminum allows it to be processed into filamentary configurations with minimal nonuniform deformation. As a result, no serious filament necking or breaking will occur during such processing. And, importantly, its alloying elements, iron and cerium, are essentially diffusionless during processing. This is desirable because, otherwise, the high-purity filaments would be contaminated by impurity and/or alloying element diffusion during annealing cycles resulting in a great loss of electrical conductivity.

Al-Fe-Ce alloy for use in the present invention consists essentially of 4 to 12 wt.-% Fe, 2 to 14 wt.-% Ce, remainder substantially Al. An Al-Fe-Ce alloy sub-group has the iron and cerium contents 4 to 10 wt.-% Fe and 2 to 9 wt.-% Ce. The Al-Fe-Ce matrix billet is prepared by the powder metallurgy approach. Further information concerning this alloy and its manufacture is contained in U.S. Pat. Nos. 4,379,719, 4,464,199 and 4,927,469.

Matrix alloys similar to the Al-Fe-Ce type, i.e., Al-Fe-V, Al-Fe-V-Si, Al-Fe-Mo, Al-Fe-Cr, etc., where the diffusion rates of the solute elements in Al are comparable to or lower than Fe and/or Ce are representative of other applications of the invention. Diffusion rates of elements may depend on the state in which an element is present in an alloy; for instance, the diffusion rate of an element may vary, depending- on whether it is present in solid solution or as part of an intermetallic compound.

The purity of the Al filaments can encompass a wide range, being governed by considerations such as balancing the cost of achieving higher purity against the energy saved by the accompanying higher conductivity. The rods of high-purity aluminum are preferably cast metal extruded to the required sizes.

In a useful adjunct of the invention, an Al-4% Fe-2% Ce alloy is provided as a matrix material. The use of a lower solute alloy, Al-4% Fe-2% Ce alloy, reduces the strength mismatch between the matrix and the filaments - the composite wire with the lower solute matrix also achieves the desired final mechanical strength.

In addition, the technology of this invention also applies to the codeformation by hot extrusion and cold drawing of any dissimilar materials where the strength differentials are similar to those that exist in the case of composite system Al-Fe-Ce matrix, pure aluminum core material.

Preparation of Extrusion Billet

Preparatory to the step of extrusion in the invention, a bimetallic, or multimetallic, arrangement of the constituents of the composite is brought about in some way. Information on various techniques for doing this is presented in Chapter 8, "Bimetals", *Handbook of Metal-Forming Processes*, B. Avitzur, John Wiley & Sons, New York, 1983. A preferred method proceeds on the basis of billets of the matrix alloy, for example billets of IN-NOMETAL TM X8019, produced by Aluminum Company of America, of nominal composition Al-8.3 wt.-% Fe-4.0 wt.-% Ce. The billet of the matrix material is drilled with a hole or holes, and rods of the constituent of high electrical conductivity are placed in the holes. The portion of the cross sectional area of the composite billet which is matrix and that which is high purity metal is desirably around 50% each, but the matrix may range, for example from 10% to 75%, with the range for the high purity metal being correspondingly 90% to 25%.

In order to resist any tendency of the softer material in the bores from being preferentially ejected from the billet, for example in the initial stages of the extrusion, a nose piece is welded on the die-end of the billet, capping the hole or holes containing the high-purity material on at least one side. A follower billet is typically welded on the dummy block/ram side, closing the holes on the other side. The follower billet serves to provide greater yield of composite, especially in cases where a streamline die is used in the extrusion process.

Extrusion

A first step in the production of the composite wire is hot extrusion to produce redraw rod which is then subsequently drawn to wire. In the case of composite of Al-Fe-Ce matrix, high-purity aluminum core, extrusion temperatures may be in the range of about 400°-525° C.

The difference in yield stress between the matrix and filament is an important parameter which influences the uniformity of codeformation during hot extrusion and during wire drawing. This difference should be at or below about 175 MPa, preferably at or below about 125 MPa, at 22° C, and at or below 60 MPa, and preferably at or below about 45 MPa, at 400° C.

Streamline die extrusion practice can produce in a single stage, using a large reduction ratio, large quantities (e.g. >15.2 meters) of redraw rod for subsequent drawing.

The streamline die minimizes distortion of the high purity Al filaments. Design of the streamline extrusion die is based upon the theory developed by Richmond et al., *Mechs. Phys. Solids*, Vol. 15, p. 195, 1967; and *Proc. 4th U.S. National Congr. Appl. Mechs.*, p. 1053–1057, 1962.. The principle of this die design is to produce uniform strain across the cross-section of the material being extruded.

Wire Drawing

Intermediate annealing treatments may be used toward achieving a desired amount of reduction in cross sectional area. It is necessary to select the lowest practical annealing temperature in order to minimize contamination of the high purity filaments by diffusion of matrix elements (Fe and Ce in the case of Al-Fe-Ce alloy) which would increase the resistivity of the high purity filaments. RRR should not be permitted to drop below about 250, since by then the advantage of the material has essentially been lost. An optimum anneal for Al/Al-Fe-Ce composites is about one hour at 426° C.

In general, there is a maximum area reduction per die, with any higher reduction resulting in a fracture of the rods due to the drawing stresses exceeding the fracture stress of the composite rod. In the case of Al-Fe-Ce alloy, this was determined to be 6–8% reduction in area per die. Certainly, a reduction in area much less than the 30 or 40% reduction achievable in the usual drawing of aluminum alloy wire is needed, and probably even 15% reduction is too much.

In order to prevent center bursting and other centerline defects, the total area reduction between anneals is restricted. In the case of Al-Fe-Ce alloy, this maximum reduction lies about in the range 30–35%. This is particularly true for four filament composite which has a large area of hard matrix alloy with a low work hardening rate in the center.

The semi-cone angle of the drawing dies (semi-cone angle is half the included angle of the die) is another important variable to be controlled to prevent centerline defects and also to achieve uniformity of deformation. Semi-cone angles of 4°-12° were utilized for drawing Al/Al-Fe-Ce composites. Defect free drawing is favored when the angle is closer to 4°, this being consistent with a reduction in the 'Δ' parameter. See R. N. Wright, *Wire Technology*, Vol. 4, #5, pp. 57–61, 1976, and *Wire Journal*, Vol. 12, #10, pp. 60–1, 1979. The lower the 'Δ' parameter, the lower the centerline hydrostatic stresses and hence the lower the chances of centerline defects. Additional information on the prevention of central bursting is provided by Zimerman and Avitzur, *Metal Progress*, Feb. 1969, pp. 103–4, and Zimerman et al., METAL FORMING, Plenum Press, New York, 1971.

In summary, for composites of pure aluminum core material and Al-Fe-Ce matrix, optimum drawing parameters for drawing composite rod into wire are:
  6–8% reduction per die
  30–35% area reduction between anneals
  Annealing at 426° C. for 1 hr
  Die semi-cone angle of 4°-8°, preferably closer to 4°

It is to be recognized that these parameters have been learned on the basis of work with composite cross sections of 50% Al-Fe-Ce aluminum alloy matrix, 50% high purity aluminum, and that variation in these parameters is to be expected when materials and/or area proportions are changed. In general, the parameters should not range widely from those given above, except perhaps when the proportion of the softer, high purity metal becomes very high.

By drawing practice according to the above measures, it has been possible to advance beyond pull-straight, draw bench wire drawing equipment and to utilize draw-block wire drawing machinery. From a limit of around 55-feet maximum wire length for draw bench equipment, draw-block machinery operated according to the invention provides continuous lengths of wire limited essentially only by beginning billet size and final wire diameter. For instance, roughly 6-inch diameter × 12-inch long cylindrical billet of Al-Fe-Ce matrix, pure aluminum filament cores, has been drawn in 400 to 500 foot continuous lengths of 0.03-inch diameter wire.

BRIEF DESCRIPTION OF DRAWINGS

FIGS. 8(a) to 8(c) are: (a) a longitudinal partial cross section showing an extrusion apparatus of the invention, including a streamline die; (b) a side view, partially in longitudinal cross section, of an extrusion charge; and (c) a plot of the lower curve in the cross section of the streamline die shown in FIG. 8(a), where the extrusion-cylinder to die contact occurs at the axial dimension Z=0.334 inches and "Specs" designates the desired curve as determined per the references of Owen et al.

cited herein and "calculated" designates the curve as actually machined.

MODES FOR CARRYING OUT THE INVENTION

Figures 1A, 1B, 1C:
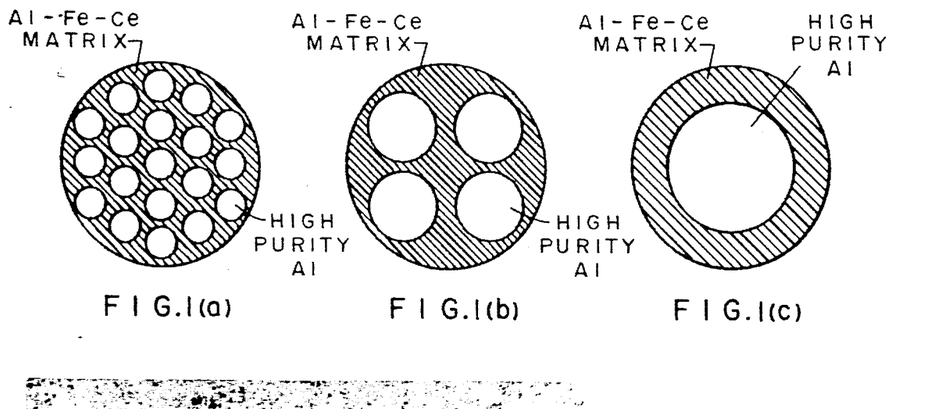
FIGS. 1(a) to 1(c) are cross sections of exemplary billet for processing into composite conductor as follows: (a) 19 filament configuration; (b) 4 filament configuration; (c) 1 filament configuration.

The invention is illustrated on the basis of three composite exemplary geometries containing 19, 4 and 1 aluminum filaments, as illustrated in FIGS. 1(a) to 1(c). In each case, the area fraction of aluminum was about 0.5. Two alloys, namely, Al-8% Fe-4% Ce and Al-4% Fe-2% Ce, were selected as matrix material, in order to assess the influence of matrix flow stress on fabricability.

The matrix alloys were processed from atomized powders to yield 15.5 cm diameter × 30.5 cm long fully dense cylindrical billets. Suitable billet in the case of the 8% alloy is produced by Aluminum Company of America under the designation INNOMETAL ™ X8019 of nominal composition Al-8.3 wt.-% Fe-4.0 wt.-% Ce.

The cylindrical billets were drilled axially to provide the bores of the FIGS. 1(a) to 1(c); dimensions may be scaled from FIGS. 1(a) to 1(c), knowing the 15.5 cm outer diameter of the matrix. The rods placed in the bores to form the conductor cores of the composite billets were extruded high purity aluminum (99.999% aluminum) rods with a Residual Resistivity Ratio (RRR = $\rho 300$ k/$\rho 4.2$ k) of approximately 1350. A sliding fit was used for the rods in the bores.

Figure 8A:
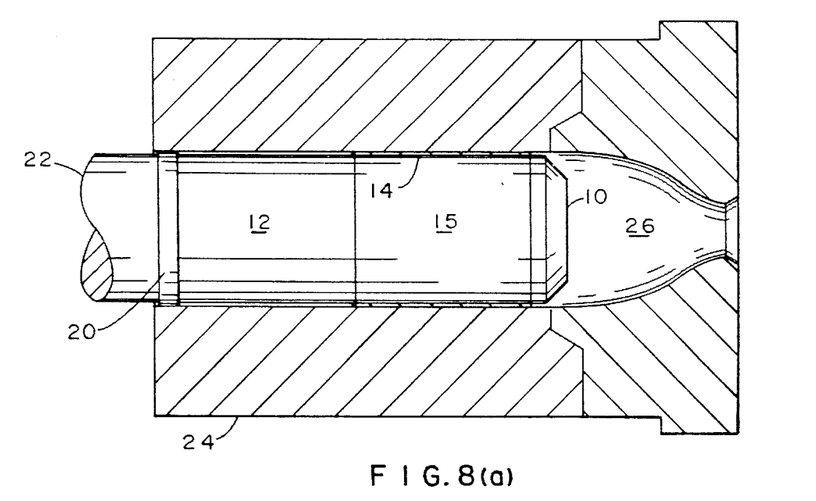
Figure 8B:
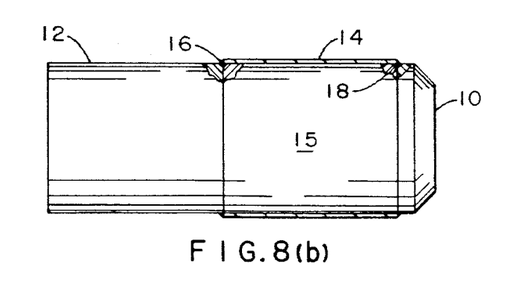

As shown in FIG. 8(b), an 1199 aluminum alloy, hot rolled, 15.5 cm diameter × 2.5 cm thick, chamfered nose piece 10 and a 6XXX aluminum alloy, 15.5 cm diameter × 30.5 cm long, follower billet 12 were welded to each composite billet 15. The nose piece prevents preferential extrusion of the Al rods during the initial transient stage of extrusion and the follower billet helps reduce loss of the useful composite billet in the streamline die. In order to minimize friction between the hard matrix alloy and the extrusion cylinder and die wall, a 0.16 cm thick, hot and cold rolled, 1199 aluminum alloy sleeve 14 was wrapped around the composite billet and welded all around. Circumferential welds 16 and 18 are the welds which join follower billet, composite billet, nose piece, and sleeve into a single unit. Like the high purity aluminum cores, 1199 aluminum alloy has a lower room temperature yield strength than that of the Al-Fe-Ce matrix.

Prior to extrusion, the surface of the assembly was roughened by grit, or sand, blasting, to provide depressions for reception of lubricant, and then coated at room temperature with a water-base extrusion lubricant (Polygraph), followed by baking at 300° F. for one hour to remove the water. Upon heating to extrusion temperature, and just prior to extrusion, an oil-base lubricant (Fiske 604) was additionally brushed onto the assembly.

The composite billets were extruded in an extruder, the essentials of which were as shown in FIG. 8(a), at 482°–510° C. and a ram speed of 2.54 cm/min through a streamline die with an extrusion area reduction ratio of 72:1 to produce a 1.9 cm diameter redraw rod. This reduction ratio is 4.5 times larger than any previous extrusions (16:1 in U.S. Pat. No. 4,711,825) of which we are aware for this composite. FIG. 8(a) shows the welded unit of FIG. 8(b) at the beginning of being pressed by dummy block 20 and ram 22 through cylinder 24 and streamline die 26.

Figure 8C:
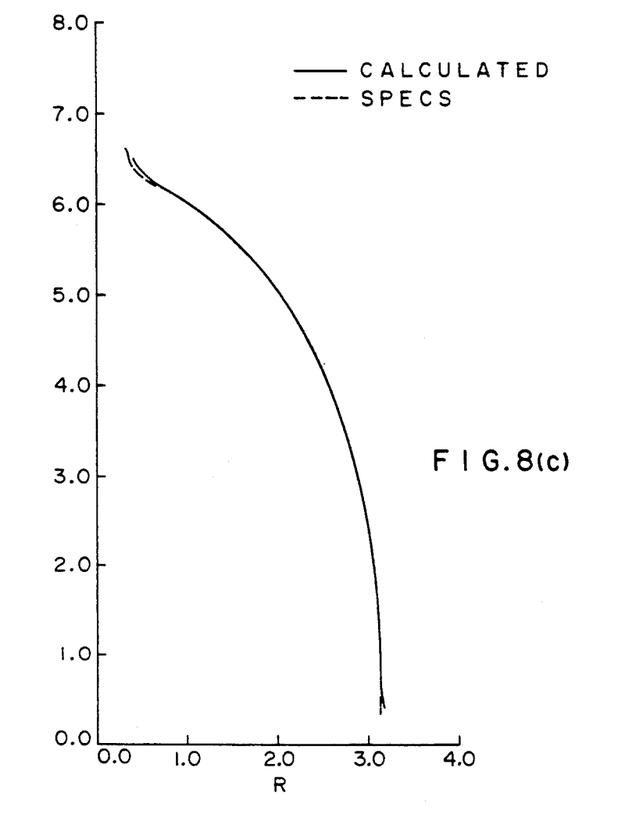

As indicated in the Brief Description of Drawings, FIG. 8(c) provides information on the contour and curvature of the inside, working surface of the streamline die 26.

The extruded redraw rod was subsequently cold formed to wire of 0.25 cm–0.01 cm diameter by wire drawing. Drawing was by single passes using a 36-inch diameter draw, or bull, block down to 0.180-inch wire and then a 22-inch diameter block for diameters beneath 0.180-inch. The wire drawing machinery was essentially as shown in FIG. 13-3 and described with reference to the use of bull blocks for wire drawing on page 13-4 of TOOL AND MANUFACTURING ENGINEERS HANDBOOK, Vol. 2, "Forming", 4th Edition, (Society of Manufacturing Engineers, Dearborn, Mich.). Each pass involved an area reduction of about 6%. Every fourth or fifth die, i.e. after about 30% reduction in area, the drawn product was annealed at 426° C. for one hour. In the diameter range 0.75 inches down to about 0.375 inches, a heavy oil lubricant with a viscosity of about 1600 SUS, as measured at 70° F., was used for drawing. Lighter oils of about 900 SUS, as measured at 70° F., were used for diameters at or below 0.375 inches. A semi-cone reduction angle of 12.5° was used down to 0.538 inches, and a 8° or 4° semi-cone angle from there on down. Some center bursting was observed at 8°, and a 4° semi-cone angle appeared to prevent the occurrence of any center bursting.

Greater than 120 meter lengths each of continuous composite wire of all three geometrical variations were produced. The redraw rod was also fabricated by wire drawing to 40–50 ft of 0.4 cm × 0.4 cm square conductor. Electrical resistivity of the wires was measured by the 4-point probe technique after various annealing treatments to determine the effect of annealing on the RRR of the wires. Tensile tests were also performed on the wires.

Figure 2A:
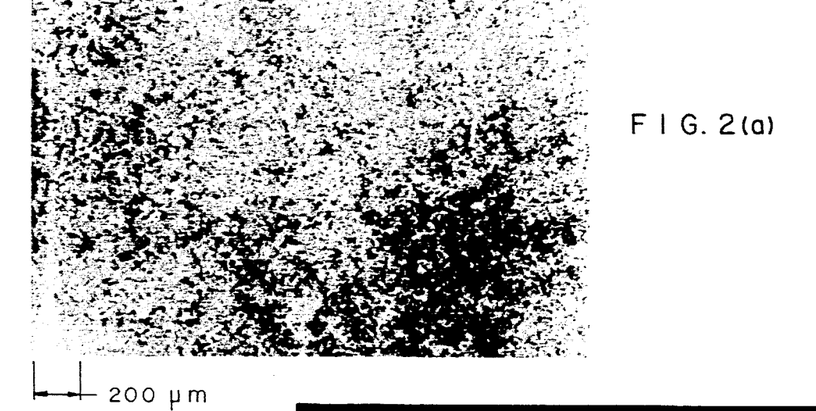
FIGS. 2(a) and (b) are optical micrographs showing the microstructure of the starting components of the composite conductor as follows: (a) hot pressed Al-8% Fe-4% Ce matrix billet; (b) hot extruded high purity Al filament, longitudinal section.
Figure 2B:
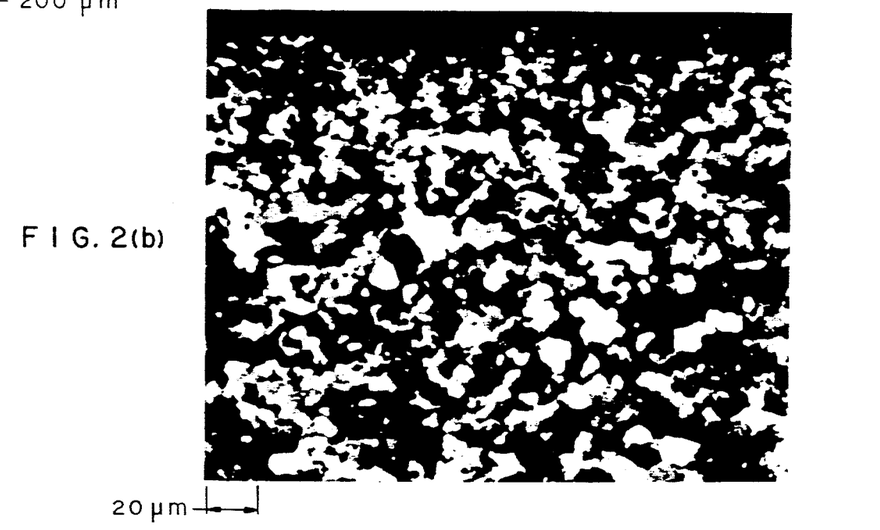

Typical microstructures of the hot pressed matrix billet and the starting extruded aluminum filament are shown in FIGS. 2(a) and 2(b), respectively, for the 8% Fe material. The Al-8% Fe-4% Ce alloy is a dispersion strengthened alloy containing about 25% by volume of Al-Fe binary and Al-Fe-Ce ternary dispersoids. The microstructure of the Al-4% Fe-2% Ce alloy is similar, but for a lower volume fraction of dispersoids. The extruded high purity Al rod in FIG. 2(b) shows a completely recrystallized structure.

Figure 3:
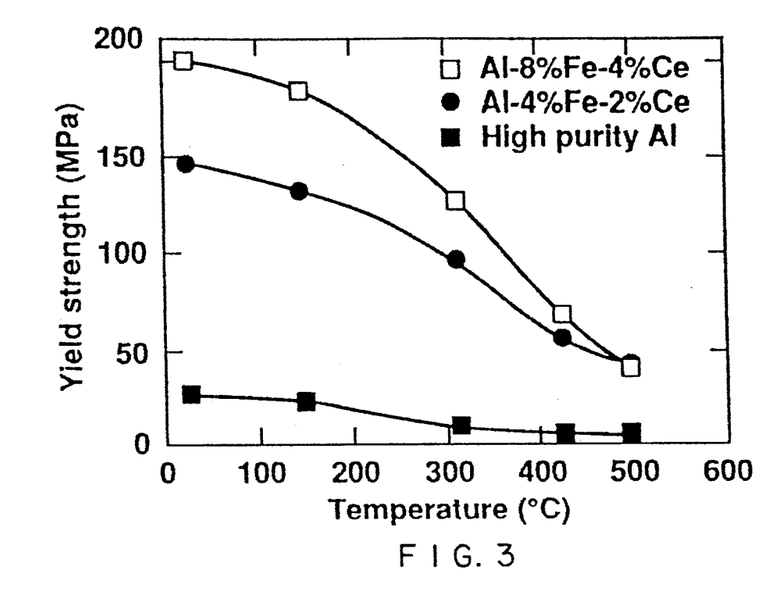
FIG. 3 shows elevated temperature yield strength response of Al-Fe-Ce alloys and high purity Al.

The flow behavior of the two matrix alloys and the starting aluminum is represented by the tensile yield strength; FIG. 3 shows its variation with temperature. The ratio of the yield strength of aluminum to that of the matrix is an important parameter which determines ease of fabrication without failure and extent of uniform deformation. The closer this ratio approaches unity, or 1, the easier the fabricability and more uniform the deformation. FIG. 3 shows that at temperatures above 400° C., for instance at the extrusion temperatures of 482°–510° C., the two matrix alloys have similar strengths, but at room temperature, there are large differences. At ambient temperatures, the Al-4% Fe-2% Ce alloy is more compatible with the high purity Al than the Al-8.3% Fe-4% Ce alloy and thus represents a more favorable matrix for uniform deformation during wire drawing.

Figure 4A:
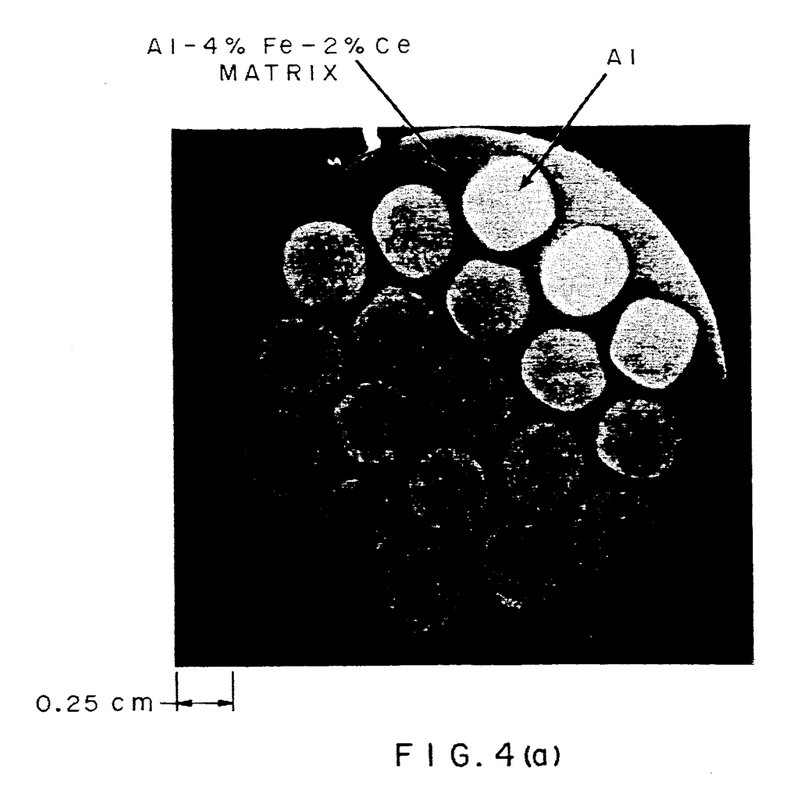
FIGS. 4(a) to 4(c) are optical micrographs showing the cross section of 1.9 cm diameter, streamline-die-extruded composite rods as follows: (a) 19 filaments; (b) 4 filaments; (c) 1 filament.
Figure 4B:
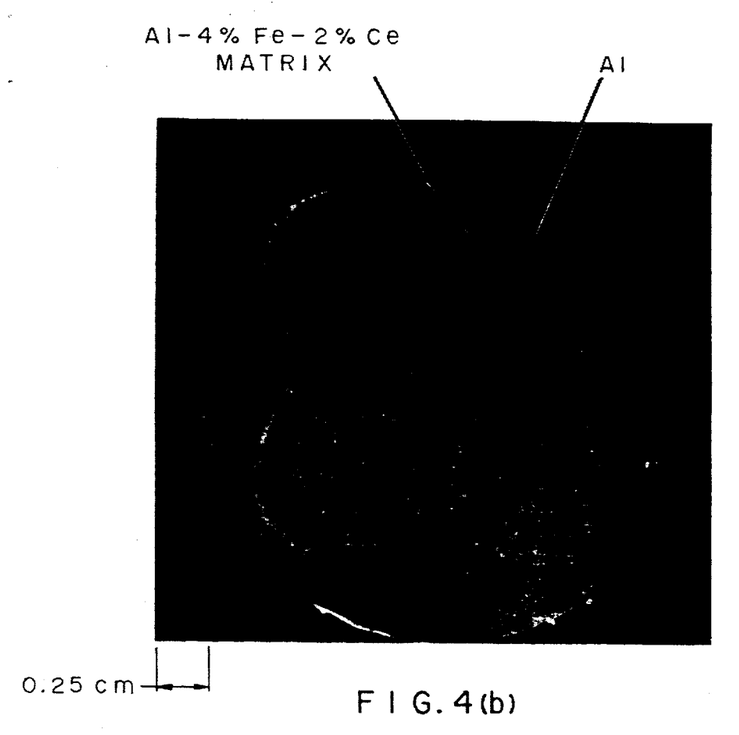
Figure 4C:
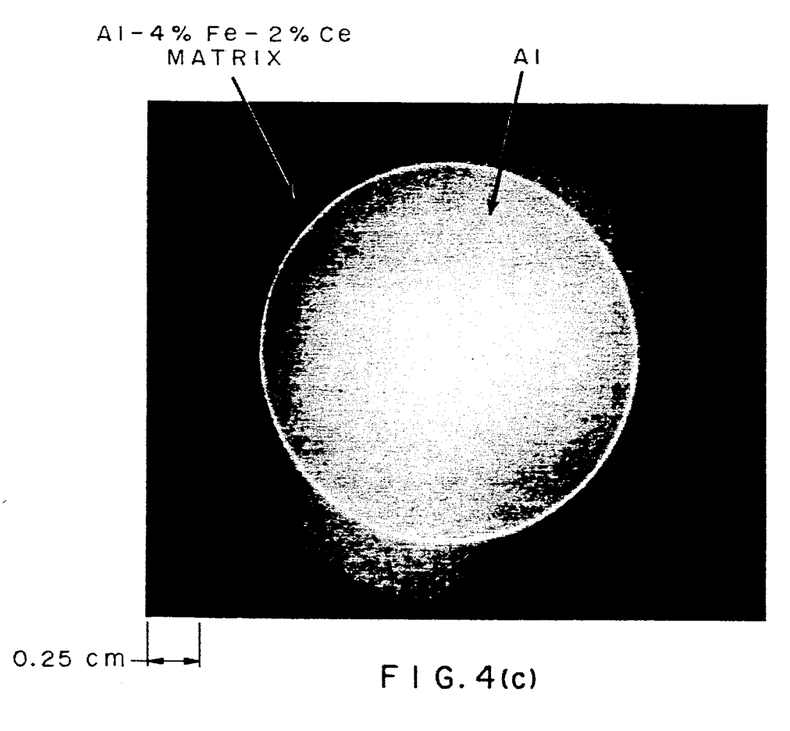
Figure 5:
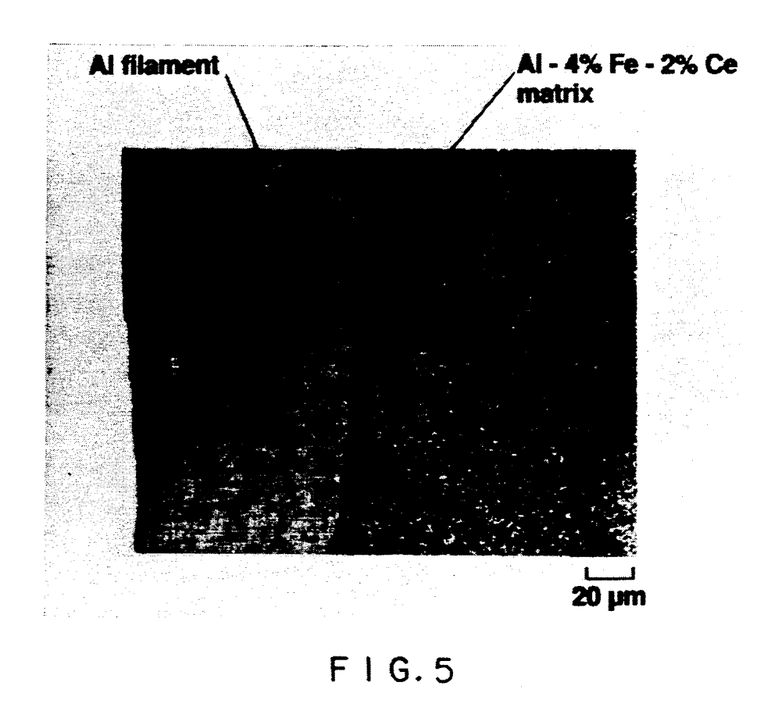
FIG. 5 is an optical micrograph of the matrix-filament interface in the extruded composite conductor.

Cross-sectional views of the extruded composite rods are shown in FIG. 4. The single filament composite shows no distortion of the aluminum filament while in the case of the 19 and 4 filament composites, the individual filaments are distorted although the original arrangement is generally maintained. This distortion is attributed primarily to friction at the die surface which results in nonuniform deformation across the section. No differences were observed in the arrangement and distortion of filaments in the extruded composites between the low and high solute matrices. This was expected since the flow stresses of the two matrix alloys are similar at this temperature. After hot extrusion, the matrix-filament interface is well bonded and no porosity or delamination was observed, FIG. 5. Although a good interfacial bond is necessary for effective stress and heat transfer from the aluminum filaments, it is detrimental from the point of view of diffusional contamination of aluminum filaments during annealing.

Figure 6A:
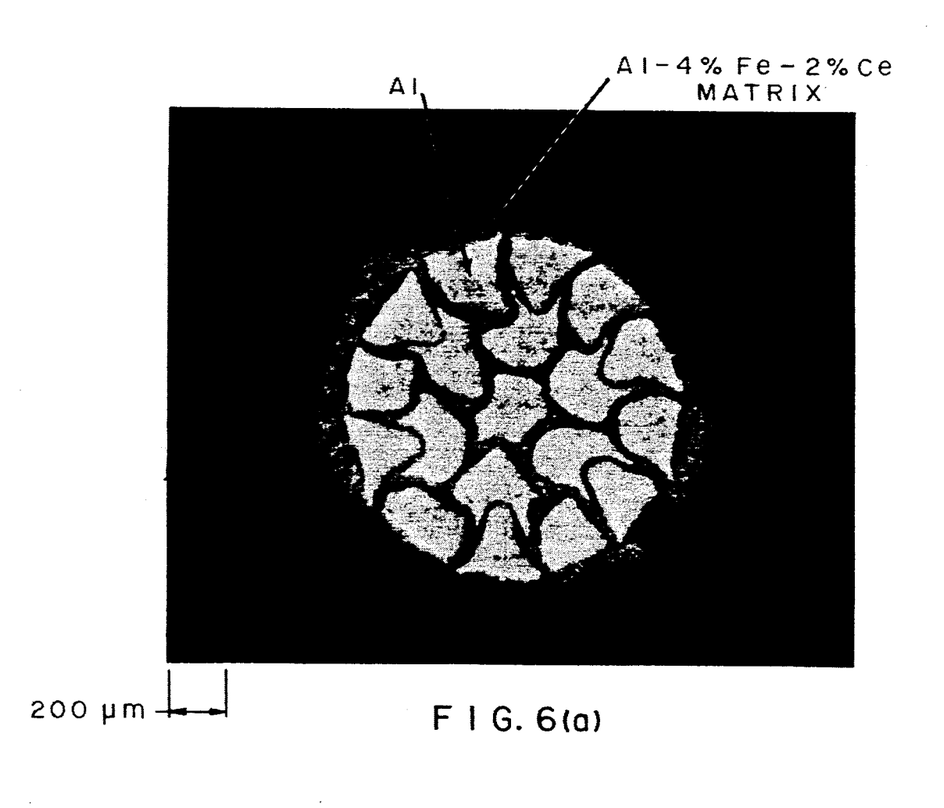
FIGS. 6(a) to (b) are optical micrographs showing cross-sections of cold drawn 0.13 cm diameter composite wires as follows: (a) 19 filament configuration; (b) 4 filament configuration; (c) 1 filament configuration.
Figure 6B:
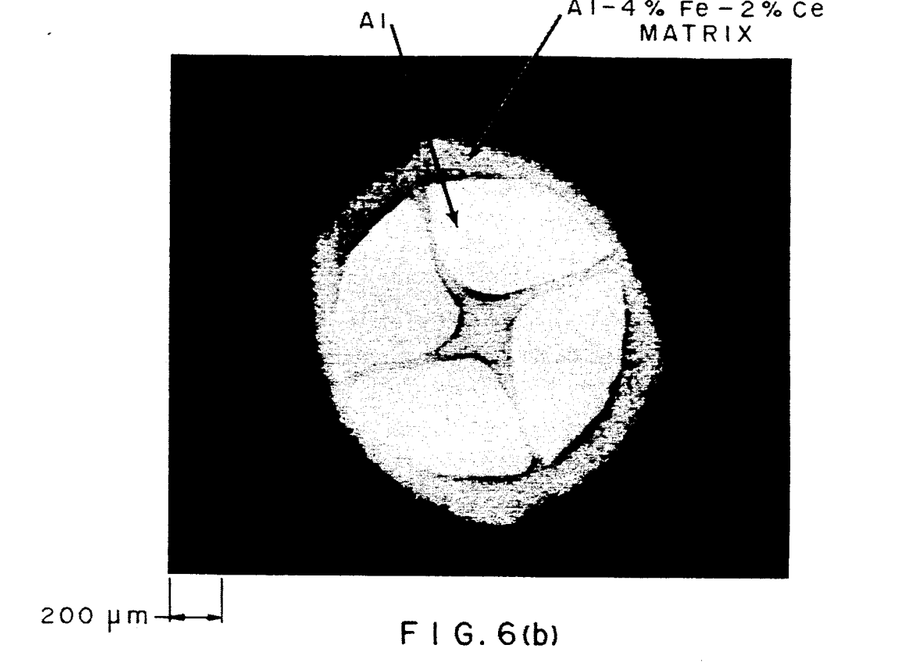
Figure 6C:
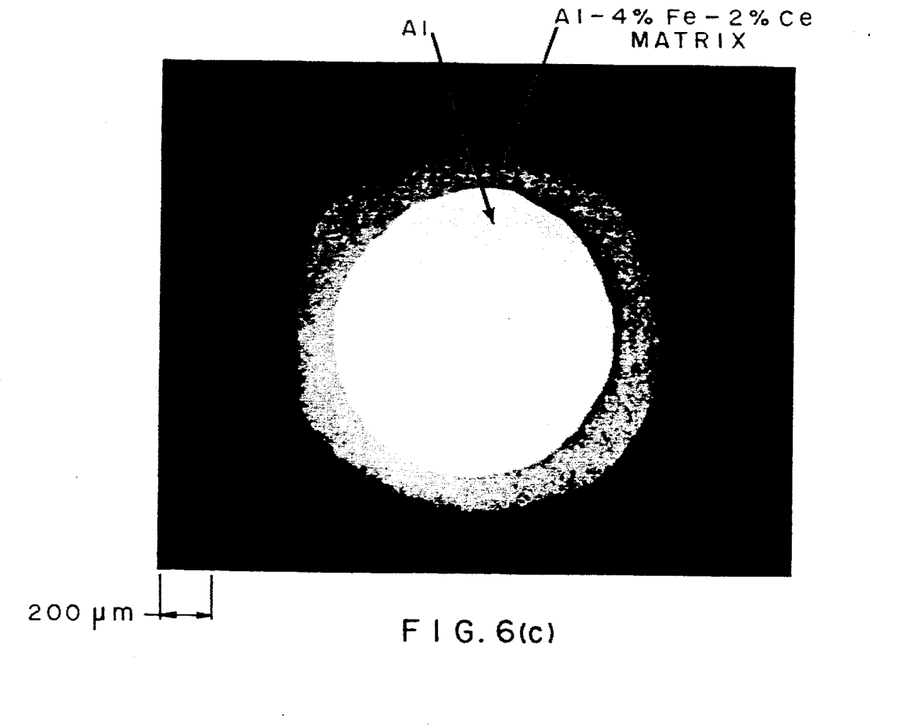
Figure 7:
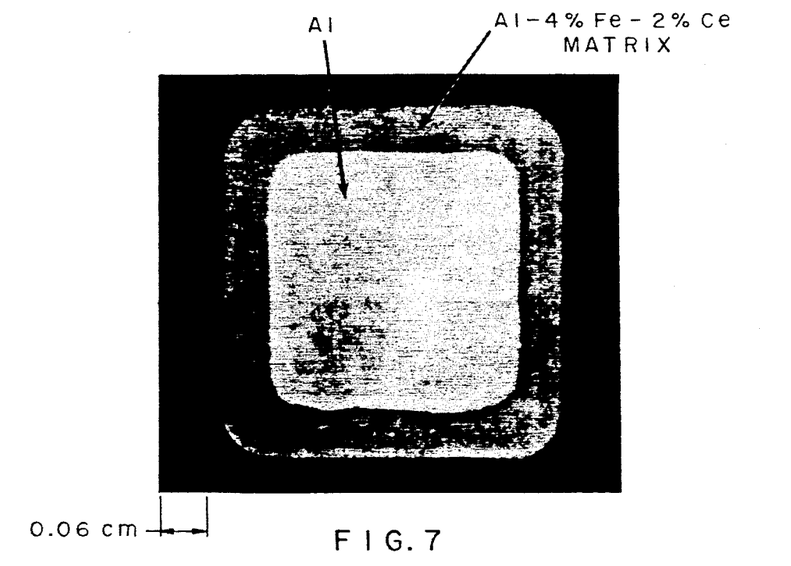
FIG. 7 is an optical micrograph showing the cross section of a 0.4 cm × 0.4 cm square extruded single filament conductor.

Wire drawing results in progressively more distortion of the aluminum filaments in the 19 and 4 filament composite wires as FIGS. 6(a) and 6(b) show. The single filament composite (FIG. 6(c) shows no filament distortion. Greater than 90 meters of composite wire in the 0.13 cm to 0.08 cm diameter size range in all three configurations were produced. An example of a square cross-section containing a single aluminum filament is shown in FIG. 7. It will be appreciated that various alternative cross sectional configurations may be employed.

Figure 9:
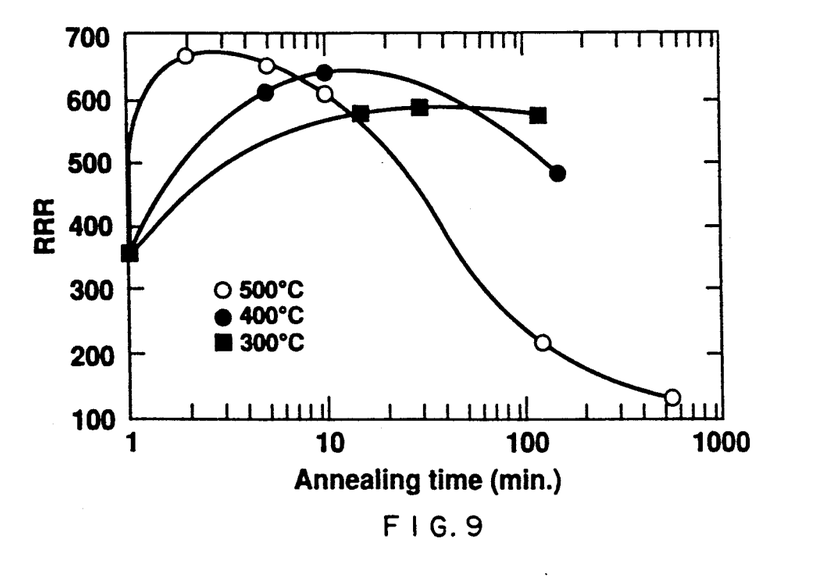
FIG. 9 shows the effect of annealing temperature and time on the RRR of 0.08 cm diameter 19 filament/Al-8% Fe-4% Ce matrix composite wire.
Figure 10:
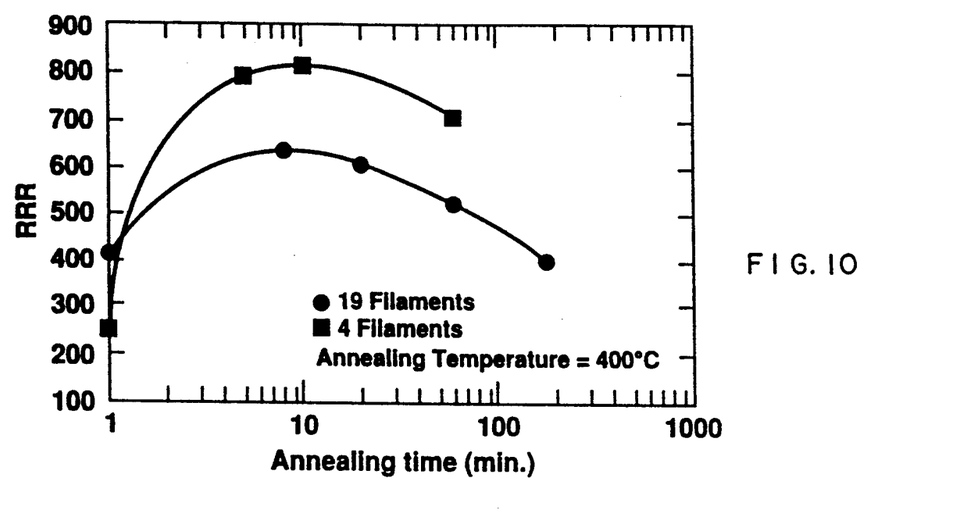
FIG. 10 shows the effect of annealing time at 400° C. on the RRR of 19 and 4 filament/Al-8% Fe-4% Ce matrix 0.08 cm diameter composite wire.

Annealing during fabrication or prior to end use of the wire can lead to contamination of the aluminum filaments by diffusion of Fe, Ce, etc. from the matrix and this, in turn, increases the resistivity of the aluminum. The degradation of RRR as a result of contamination during annealing is illustrated by FIGS. 9 and 10. In FIG. 9, the RRR initially increases to a peak and then decreases with annealing time for all three temperatures. With higher temperatures, the peak is shifted to shorter annealing times. The initial increase in RRR is due to recovery of Al filaments while subsequently, contamination of the filament contributes to the decrease of the RRR and this effect is more pronounced at higher temperatures where diffusion is faster. The data in FIG. 9 is for the 19 filament composite in the Al-8% Fe-4% Ce alloy matrix with individual filaments of 0.01 cm diameter in the final composite wire. Effect of individual Al filament size on annealing behavior is seen in FIG. 10 where the 4 and 19 filament composite wires are compared. In the 4 filament composite where the individual filaments are 0.03 cm diameter, the influence of contamination is less severe, since the relative percentage of the cross-section contaminated is smaller than in the 19 filament case for a given contamination depth. Consequently, the 4 filament composite wire recovers to a much higher RRR before it decreases. The initial differences in the RRR before annealing are due to processing variations.

Figure 11A:
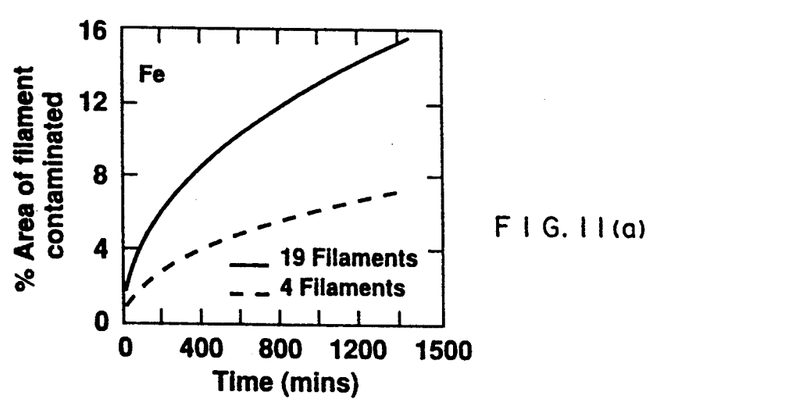
FIGS. 11(a) and (b) plot the percentage of the area of individual Al filaments contaminated by diffusion as a function of time at 400° C. for 19 and 4 filament configurations as follows: (a) by diffusion of Fe; (b) by diffusion of Si.
Figure 11B:
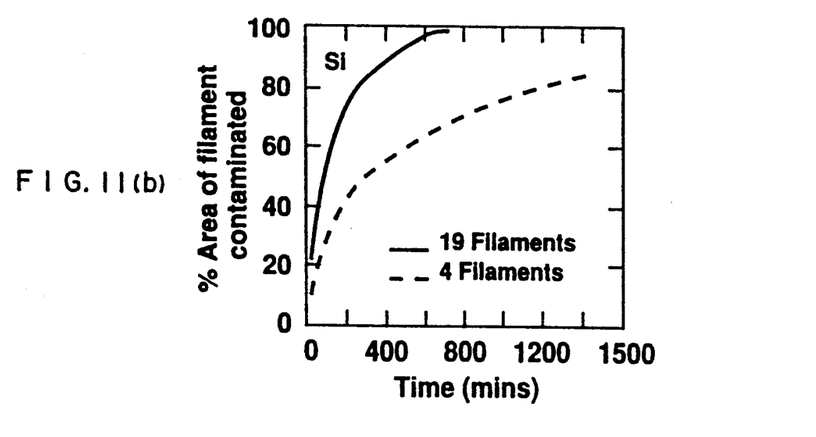

The effect of diffusional contamination of the aluminum filaments can be theoretically analyzed by calculating the extent of filament area contaminated by diffusion of alloying elements from the matrix into the filaments. This is illustrated for the diffusion of Fe and Si in FIG. 11. In the case of 19 filament composite, the effects are much more severe as the individual filaments are finer. The curves in FIG. 11 were determined on the basis of an equilibrium solubility of Fe in Al of 200 ppm, or 0.02 atomic %, and 540 ppm Si in Al, and diffusion coefficients appropriate for 400° C. The curves are for 0.03-inch diameter wire. In the case of the 19-filament wire, calculations based on the beginning billet diameter of about 6-inches give a 124-micron diameter for the pure aluminum filament. In the four filament case, individual filament diameter calculates to 267 microns.

The short peak time of the order of 10 minutes prior to the decrease of RRR that is observed in FIG. 10 cannot be explained by the diffusion of Fe, since, for these short times, less than 2% of the individual filament cross-section is contaminated. A faster diffusing species, such as Si, which is usually present as an impurity in commercial aluminum alloys, could account for it since as much as 20% of the cross-section is contaminated in the same time frame. This analysis highlights the need to minimize presence in the matrix alloy of fast diffusing alloying elements.

Representative room temperature tensile properties of 0.13 cm diameter composite wires are given in TABLE I. The strength of the matrix alloy is reflected in the composite with the lower solute alloy having lower yield and tensile strengths. The tensile elongations vary from 3.6% to 11.5%, a large scatter which is due to the sensitivity of elongation to surface flaws during tensile testing of such fine wires.

Electrical property of interest in the final composite wire is the residual resistivity ratio (RRR) which is the ratio of the resistivity of the wire at ambient temperature to that at 4.2° K. The higher this ratio, the purer the Al. The starting RRR of the pure aluminum was about 1350. The RRR of the composite wires are given in Table II, where "RRR as Drawn" is for wire still containing the cold-worked condition of the final draw, whereas "RRR After Annealing" shows the increase obtained by subjecting the wire to 400° C. for 20 minutes to relieve the cold-worked condition. The data in Table II shows the different effect of diffusion on the effective conductivity of the high purity aluminum filaments as a function of wire size, as explained above. In the case of the thickest high purity aluminum, the final anneal brought RRR of the composite wire to 1279, a value close to the initial RRR value for the pure aluminum component of 1350.

Figure 12:
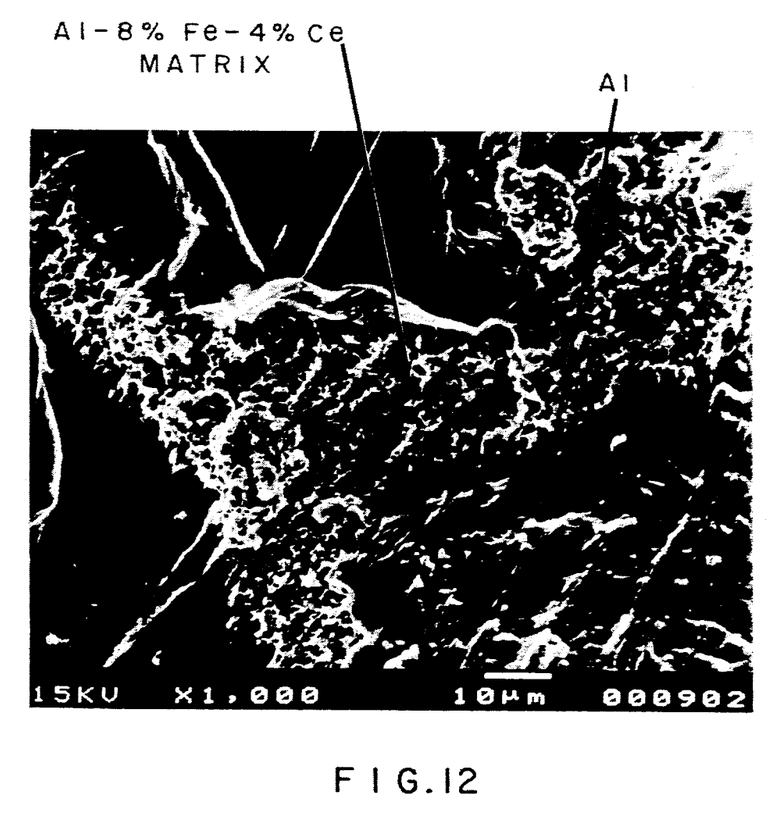
FIG. 12 is a scanning electron micrograph of the fracture surface of a 0.13 cm diameter 19 filament composite wire.

FIG. 12 shows a representative wire fracture surface. The matrix exhibits ductile fracture features and there is no evidence of delamination at the Al/matrix interface, thus underscoring the good interfacial bonding between the matrix and the filaments.

TABLE I

ROOM TEMPERATURE MECHANICAL PROPERTIES OF 0.13 cm DIAMETER COMPOSITE WIRE

| Matrix Alloy | # of Filaments | Yield Strength (MPa) | Ultimate Tensile Strength (MPa) | % Elongation |
|---|---|---|---|---|
| Al-8% Fe-4% Ce | 19 | 172 | 201 | 10.0 |
| Al-4% Fe-2% Ce | 19 | 127 | 161 | 11.5 |
| Al-8% Fe-4% Ce | 4 | 160 | 193 | 11.5 |
| Al-4% Fe-2% Ce | 4 | 138 | 164 | 8.8 |
| Al-4% Fe-2% Ce | 1 | 142 | 167 | 3.6 |

TABLE II

RRR OF COMPOSITE WIRES

| Matrix Alloy | # of Filaments | Wire Size (CM) | RRR as Drawn | RRR After Annealing |
| --- | --- | --- | --- | --- |
| Al-8% Fe-2% Ce | 4 | 0.13 | 453 | 828 |
| Al-4% Fe-2% Ce | 4 | 0.08 | 365 | 448 |
| Al-4% Fe-2% Ce | 1 | 0.13 | 531 | 1279 |
| Al-4% Fe-2% Ce | 1 | 0.08 | 476 | 860 |

We claim:

1. A composite product comprising at least one co-drawn conductor and a matrix, said conductor consisting essentially of substantially pure aluminum and said matrix comprising an aluminum alloy selected from the group consisting of:
   (a) Al-Fe-V-Si aluminum alloy and
   (b) an aluminum alloy consisting essentially of 3 to 5 wt.% Fe, 1 to 3 wt.% Ce, balance substantially aluminum.

2. A product as claimed in claim 1, comprising co-extruded and co-drawn conductor and matrix, with matrix outside.

3. A product as claimed in claim 1, wherein the matrix comprises an aluminum alloy consisting essentially of 3 to 5 wt.% Fe, 1 to 3 wt.% Ce, balance substantially aluminum.

4. A product as claimed in claim 1, wherein the matrix comprises Al-Fe-V-Si aluminum alloy.

5. A product as claimed in claim 1, wherein the matrix contains about 4 wt.-% Fe, about 2 wt.-% Ce, and remainder substantially Al.

6. A method of using an alloy consisting essentially of 3-5 wt. % Fe, 1-3 wt. % Ce and remainder substantially Al, comprising providing it as a matrix in a co-drawn composite containing a core of essentially pure aluminum.

7. A billet comprising a matrix material, a core material in at least one hole within the matrix, and a sleeve on the matrix material, the core material and the sleeve both have yield strengths lower than the matrix material.

8. A billet as claimed in claim 7, with a roughened exterior surface and lubricant on the roughened surface.

9. A billet comprising a matrix material, a core material in at least one hole within the matrix, and a follower on the matrix material.

10. A product as claimed in claim 1, the product having a continuous length greater than 55-feet.

11. A product as claimed in claim 1, the product having a continuous length greater than or equal to 40-feet.

* * * * *